US012413033B2

(12) United States Patent
Pardue

(10) Patent No.: US 12,413,033 B2
(45) Date of Patent: Sep. 9, 2025

(54) SECURE LOW PROFILE ELECTRICAL OUTLET EXPANDER

(71) Applicant: Darren Scott Pardue, Ada, OK (US)

(72) Inventor: Darren Scott Pardue, Ada, OK (US)

( * ) Notice: Subject to any disclaimer, the term of this patent is extended or adjusted under 35 U.S.C. 154(b) by 289 days.

(21) Appl. No.: 18/445,352

(22) Filed: Jul. 25, 2023

(65) Prior Publication Data

US 2025/0038465 A1 Jan. 30, 2025

(51) Int. Cl.

| | |
|---|---|
| ***H01R 31/02*** | (2006.01) |
| ***H01R 13/621*** | (2006.01) |
| ***H01R 13/72*** | (2006.01) |
| ***H01R 31/06*** | (2006.01) |

(52) U.S. Cl.
CPC ........... *H01R 31/02* (2013.01); *H01R 13/621* (2013.01); *H01R 13/72* (2013.01); *H01R 31/06* (2013.01)

(58) Field of Classification Search
None
See application file for complete search history.

(56) References Cited

U.S. PATENT DOCUMENTS

| | | | | |
|---|---|---|---|---|
| 5,004,435 | A | 4/1991 | Jammet | |
| 5,094,630 | A * | 3/1992 | Jammet | H01R 31/02 439/652 |
| 6,155,880 | A * | 12/2000 | Yu | H01R 25/006 439/954 |
| 6,315,593 | B1 * | 11/2001 | Bentley | H01R 13/6395 439/346 |
| 6,315,617 | B1 * | 11/2001 | Al-Sabah | H01R 13/6666 439/652 |
| 6,482,043 | B1 | 11/2002 | Stout | |
| 6,619,980 | B1 * | 9/2003 | Hsiao | H01R 27/02 439/502 |
| 7,862,385 | B2 | 1/2011 | Lee | |
| 9,161,464 | B2 * | 10/2015 | Liao | H02J 7/0044 |
| D981,961 | S | 3/2023 | Liu | |
| 2014/0367138 | A1 | 12/2014 | Godfrey | |

* cited by examiner

*Primary Examiner* — Tho D Ta
(74) *Attorney, Agent, or Firm* — Randal D. Homburg

(57) ABSTRACT

An electrical outlet expander installing within a household wall outlet provides a low profile connection for one or more electrical outlet connections in a vertical orientation and one or more respective cord securing means to avoid accidental disengagement of each plug with the electrical outlet expander, the expander providing for nominal clearance making it suitable for restricted spaces between the expander and an item of furniture located against a wall.

6 Claims, 5 Drawing Sheets

SECURE LOW PROFILE ELECTRICAL OUTLET EXPANDER

CROSS REFERENCE TO RELATED APPLICATIONS

None.

I. BACKGROUND OF THE INVENTION

1. Field of Invention

An electrical outlet expander installing within a household wall outlet provides a low profile connection for one or more electrical outlet connections in a vertical orientation and one or more respective cord securing means to avoid accidental disengagement of each plug with the electrical outlet expander, the expander providing for nominal clearance making it suitable for restricted spaces between the expander and an item of furniture located against a wall.

2. Description of Prior Art

A preliminary review of prior art patents was conducted by the applicant which reveal prior art patents in a similar field or having similar use. However, the prior art inventions do not disclose the same or similar elements as the present electrical wall expander, nor do they present the material components in a manner contemplated or anticipated in the prior art.

In U.S. Pat. No. 5,004,435 to Jammet, a multiple socket attachment is shown being installed within a common electrical outlet, the attachment providing a plurality of additional electrical outlets, the attachment providing for a low profile placement. An extension cord lock and in line tap is disclosed in U.S. Pat. No. 7,862,385 to Lee, providing a means to secure a cord of an extension plugged into the tap. Likewise, a power adapter discloses a cable holder unit and another means for gathering an retaining a cord in U.S. Patent Publication No. 2014/0367138 to Godfrey. In Design Pat. No. D981,961 to Liu, a multiple outlet plug base is shown with a plurality of electrical outlets as well as what appears to be low voltage charging ports.

None of the prior art provide an electrical outlet plate attached to a common electrical wall outlet providing multiple electrical outlets in a vertical orientation which provide a connection of multiple electrical cords with respective cord securing means to eliminate accidental disengagement of the electrical cord and also provide the outlet place with a low profile to reduce the distance from the wall for placement behind furniture without distortion of the electrical cord and plug.

II. SUMMARY OF THE INVENTION

The primary objective of the invention is to provide an electrical expander to provide two or more household electrical outlets having a low profile from the wall with a means of securing two or more electrical cords upon the electrical expander. First, this provides the electrical expander with a secure connection to a household electrical outlet by replacing the cover plate with this electrical expander, with at least one rear three pronged electrical plug inserting within the household electrical outlet and/or with a center screw which was used to attached the cover plate being replaced attaching the electrical expander. Second, the electrical expander provides its two or more electrical outlets within an electrical outlet manifold on the front surface with the electrical outlets facing downward, requiring placement and installation of electrical cords upwards into the respective two or more electrical outlets, which are in communication by electrical wiring or ribbon between the electrical outlets within the electrical outlet manifold and the rear three pronged plug. This electrical outlet manifold provides the electrical expander with a slim profile from the wall—no greater than the width of the manifold, which provides the electrical expander ideally suited for placement behind furniture and appliances. Additionally, to resolve plugs coming loose from the electrical outlets in the electrical outlet manifold, a plurality of cord securing means are installed on the front surface of the electrical expander within which a respective electrical cord attached to an electrical plug is inserted to prevent incidental or gravitational removal of the respective electrical plug installed into the electrical outlet plug within the electrical outlet manifold.

III. DESCRIPTION OF THE DRAWINGS

The following drawings are submitted with this utility patent application.

IV. DESCRIPTION OF THE PREFERRED EMBODIMENT

Figure 1:
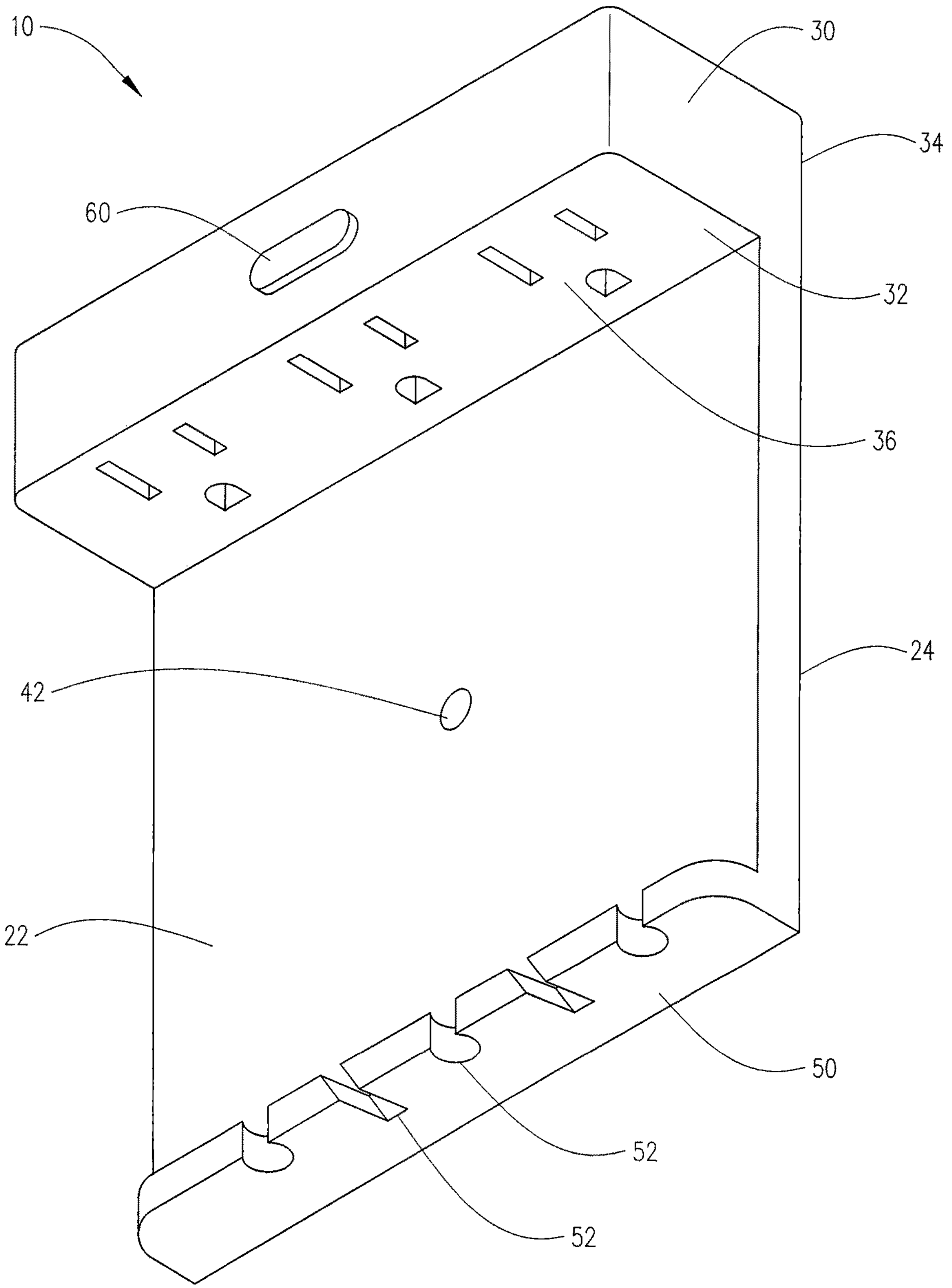
FIG. 1 is a front perspective view of the electrical outlet expander.
Figure 2:
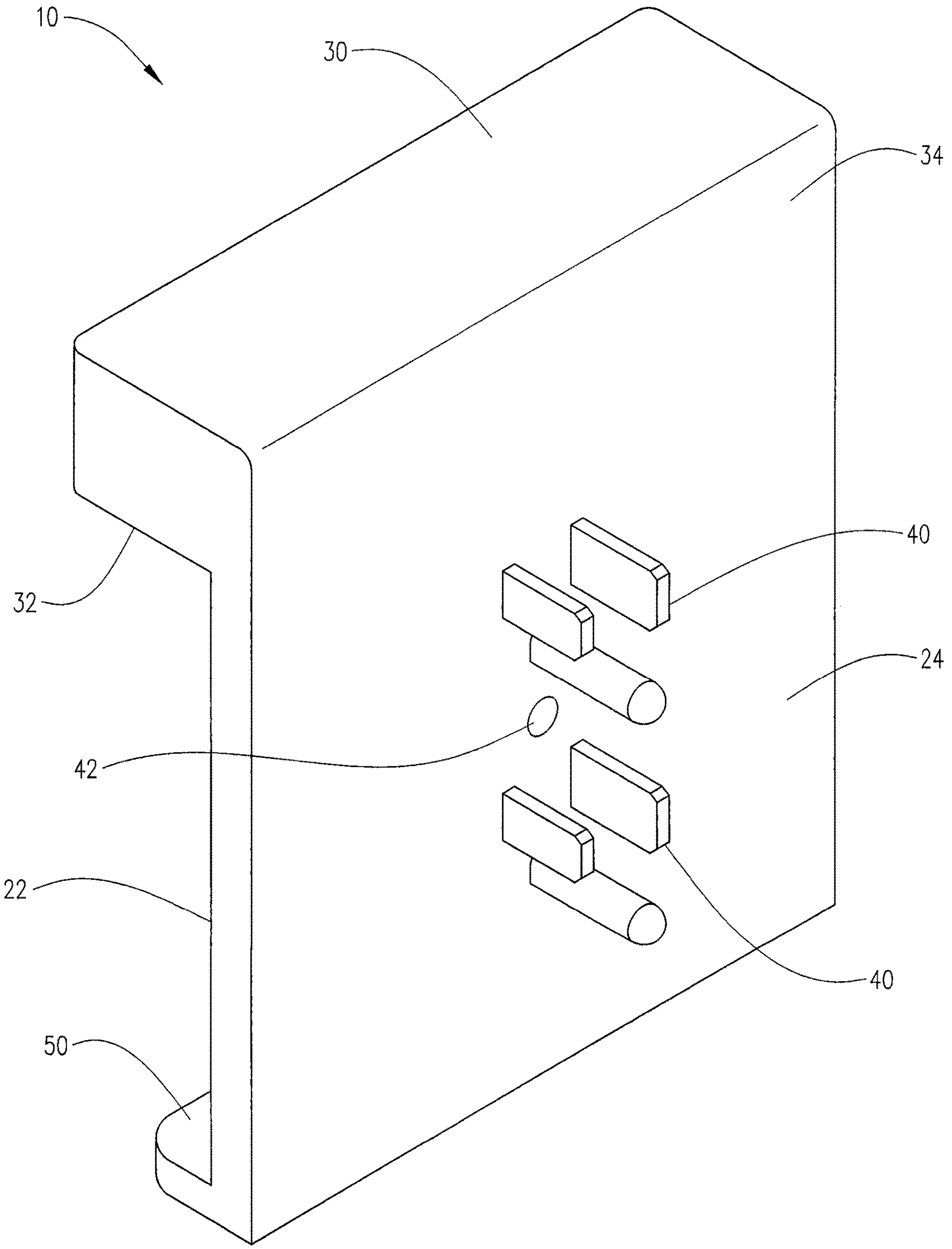
FIG. 2 is a rear perspective view of the electrical outlet expander.
Figure 3:
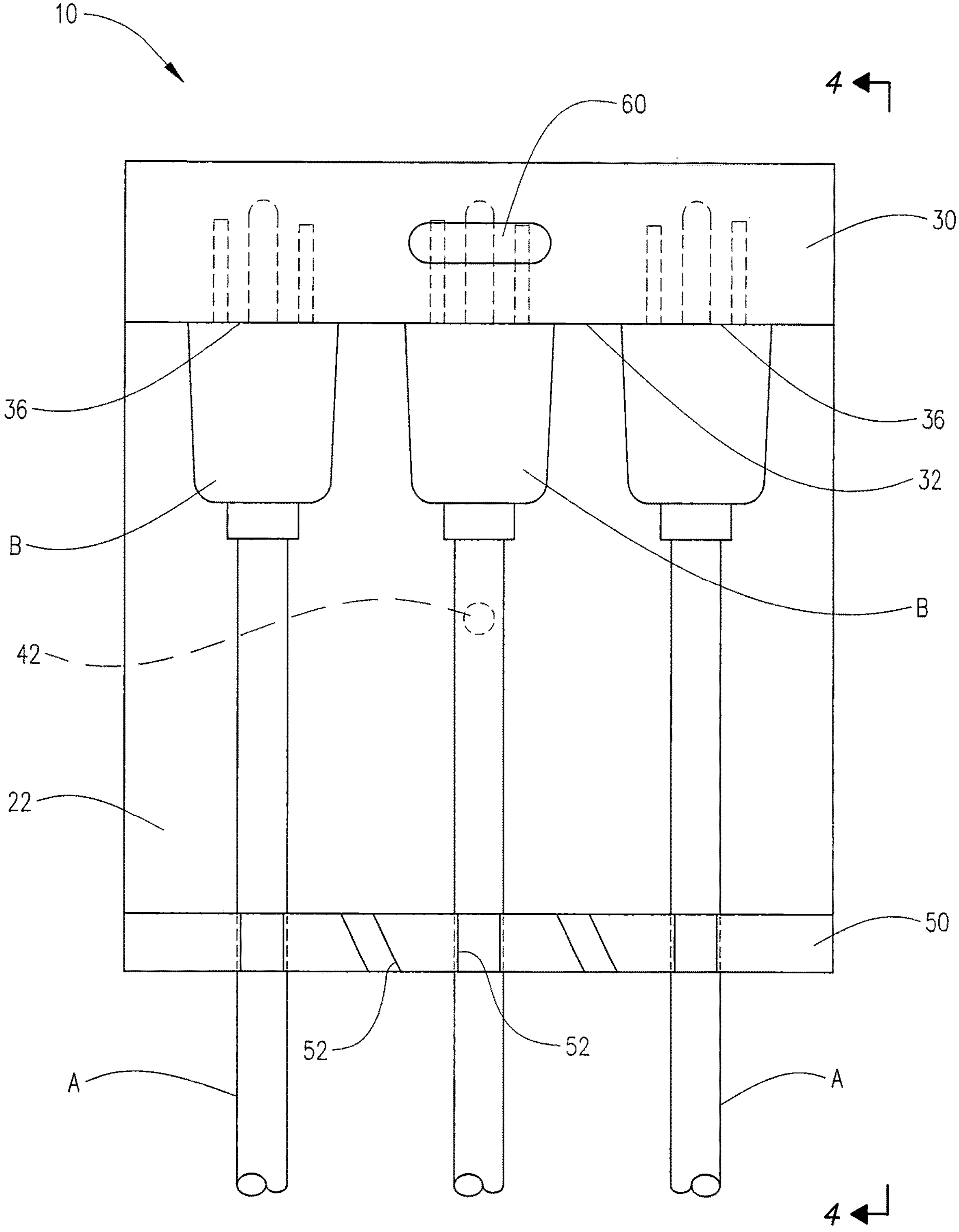
FIG. 3 is a front view of the electrical outlet expander with multiple electrical cords and plugs installed within the electrical outlet expander.

A household electrical outlet expander 10 for installation into a household electrical outlet C, FIGS. 1-6, provides a low profile plurality of electrical outlets for insertion of two or more electrical cords and cord plugs A, B, and also a means of securing the electrical cords to the electrical outlet expander 10 to prevent unintentional or accidental removal of the electrical cord plugs B plugged into the electrical outlet expander 10. The electrical outlet expander 10 defines a wall plate 20 with a front surface 22 and a rear surface 24.

The rear surface 24 provides two or more three pronged electrical wall outlet plugs 40 adapted to be installed within two or more electrical outlets C. In addition, a central bore 42 is provide through the wall plate 20 to secure the electrical outlet expander 10 into the household electrical outlet C, using the same threaded screw 44 as would have held an electrical outlet cover, FIG. 4, or it may simply be plugged in over the electrical outlet cover.

Figure 4:
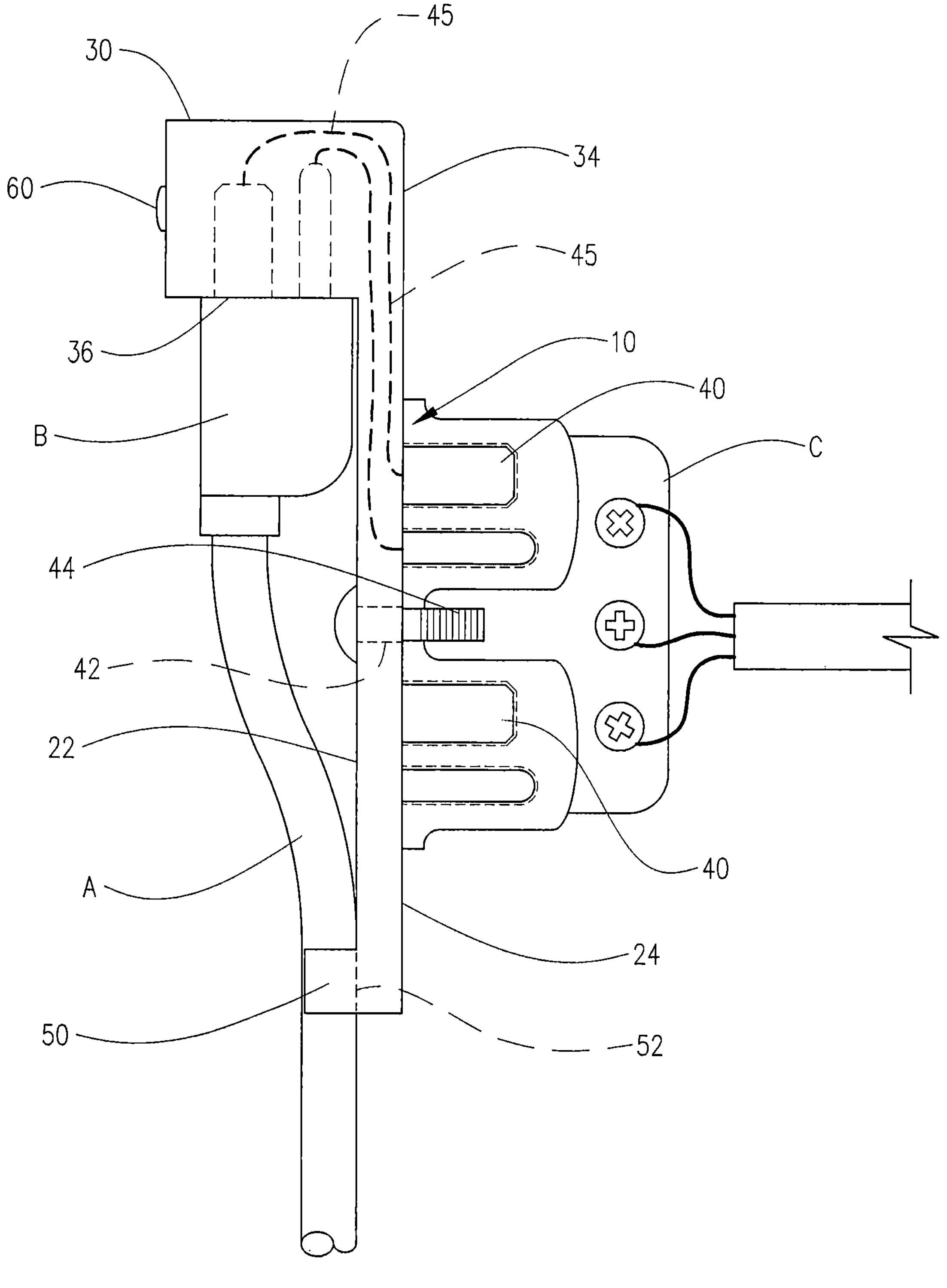
FIG. 4 is a side view of the electrical outlet expander with one electrical cord plug installed within the upper multiple plug module, the threaded screw and the conductive wire or ribbon as affixed to the household electrical outlet.
Figure 5:
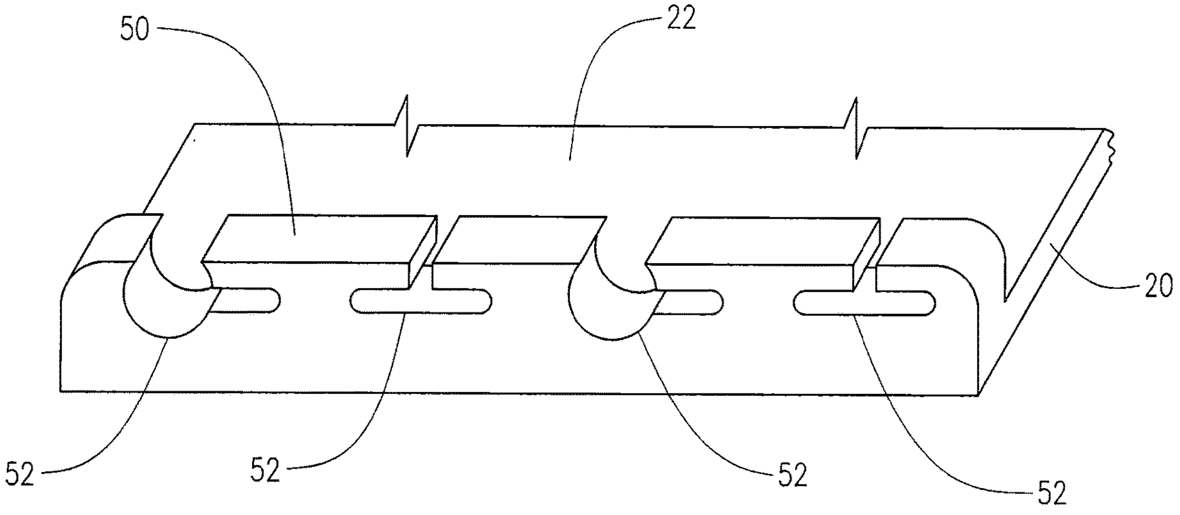
FIG. 5 is a first embodiment of the multiple cord retainer and cord retainer clips.
Figure 6:
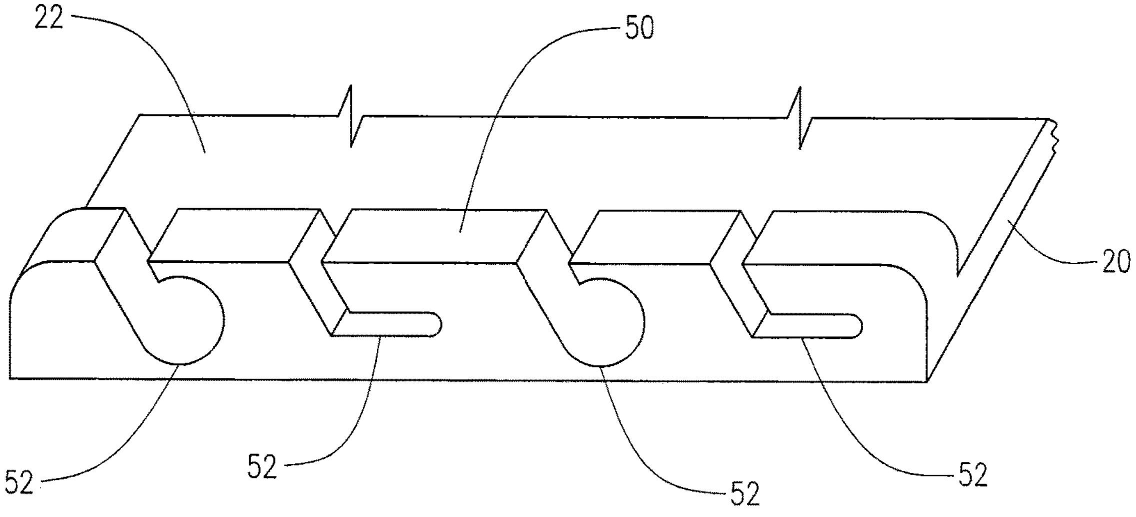
FIG. 6 is a second embodiment of the multiple cord retainer and retainer cord clips.

The front surface 22 defines an upper multiple plug module 30 in electrical communication with the two or more three pronged electrical outlet plugs 40 extending from the rear portion 24, the communication supplied by conductive wire or ribbon 45 to each of multiple electrical outlets 36 within the upper multiple plug module, FIG. 4. The preferred orientation of the multiple electrical outlets in the upper multiple plug module is downward, requiring electrical cord plugs B to be installed upward and vertically, or from below the installed electrical outlet expander 10. Thus, a lower surface 32 of the upper multiple plug module 30 provides multiple electrical outlets 36 while a rear portion 34 of the upper multiple plug module 30 is attached to or incorporated into the front surface 22 of the wall plate 20.

A multiple cord retainer 50, serving as the illustrated example of a preferred means of securing each electrical cord A and electrical cord plug B being plugged into one of the multiple electrical outlets 36 in the upper multiple plug module 30, also extends from the front surface 22, below the upper multiple plug module 30, securing the electrical cord A within one of several resilient cord clips 52 defined within the multiple cord retainer 50, FIGS. 3-6. By inserting the respective electrical cord A within the resilient cord clip 52, the electrical cord plug B inserted into a multiple electrical outlet 36 in the upper multiple plug module 30, the incidental or accidental unplugging of the electrical cord is reduced. Resilience may be provided by making the multiple cord retainer out of silicon, rubber or elastic polymer.

The vertical orientation of the electrical cords A plugged into the multiple plug module 30 and the multiple cord retainer 50 presents the electrical outlet expander 10 with its low profile character, making the electrical outlet expander 10 suited for placement behind furniture, electronic equipment, televisions, especially those that are wall mounted, stereos, lamps and desktop components. The multiple cord retainers 50 are recommended for delicate electronic equipment that might result in catastrophic consequences if accidentally unplugged during use.

It is also contemplated that a commercial grade electrical outlet expander 10 may be presented using greater than household electrical current. In addition certain additional features may be included in the disclosed electrical outlet expander 10, including a power indication display 60, an on/off switch (not shown) and a current breaker or GFI (not shown).

While the electrical outlet expander 10 has been particularly shown and described with reference to a preferred embodiment thereof, it will be understood by those skilled in the art that changes in form and detail may be made therein without departing from the spirit and scope of the invention.

What is claimed is:

1. An electrical outlet expander for attachment of one or more electrical cords comprising:

a wall plate defining a front surface defining an upper multiple plug module with a lower surface including multiple plug outlets accepting one or more respective electrical plugs from one or more electrical devices and a multiple cord retainer defining a plurality of retainer cord clips on said front surface below said upper multiple plug module accepting one or more respective electrical cords attached to said respective each respective said electrical plugs installed within each said multiple plug outlets, securing said electrical plug and said electrical cord from said one or more electrical devices vertically against said front surface; and a rear surface of said wall plate extending one or more three pronged wall outlet plug in conductive communication with said multiple plug outlets providing electrical current when said one or more three pronged wall outlet is plugged into a household electrical outlet.

2. The electrical outlet expander of claim 1, said wall plate further comprising:

a central bore providing passage of a threaded screw to securely engage said household electrical outlet when said electrical outlet expander is installed within said household electrical outlet.

3. The electrical outlet expander of claim 1, further comprising a power indication display illuminating when said electrical outlet expander is providing live current to said multiple electrical outlets.

4. An electrical outlet expander provides a plurality of electrical outlets for insertion of two or more electrical cords, installing into a household electrical outlet replacing its cover plate, comprising:

an expander wall plate having a front surface and a rear surface;

an upper multiple plug module having a rear portion extending from said front surface of said expander wall plate, further providing a lower surface defining multiple electrical outlets;

a multiple cord retainer on said front surface of said expander wall plate below said upper multiple plug module defining a plurality of retainer cord clips;

a rear surface defining one or more three-pronged wall outlet plugs installing into at least one household electrical outlet in communication with each said multiple electric outlets defined in said upper multiple plug module; and a threaded screw inserting through a central bore attaching said electrical outlet expander to said household electrical outlet to prevent incidental displacement of said installed electrical outlet expander, wherein said electrical outlet expander provides a low profile expansion of said electrical outlet expander and securely installs two or more electrical plugs and cords by insertion of each said electric plug into a respective multiple electric outlet while inserting said respective electrical cord into a selected retainer cord clip for prevent incidental or accidental removal of each said electrical cord and plug from said electrical outlet expander.

5. The electrical outlet expander of claim 4, further comprising:

a power indication display illuminating when said electrical outlet expander is providing live current to said multiple electrical outlets.

6. The electrical outlet expander of claim 4, further comprising any other element or component as disclosed in the specification of drawing figures.

* * * * *